April 14, 1959  T. S. NELSON  2,881,939
PLANTER
Filed July 12, 1956
FIG_1_
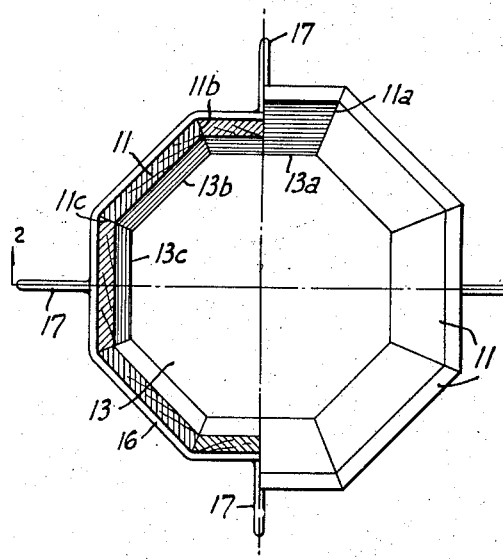
FIG_3_
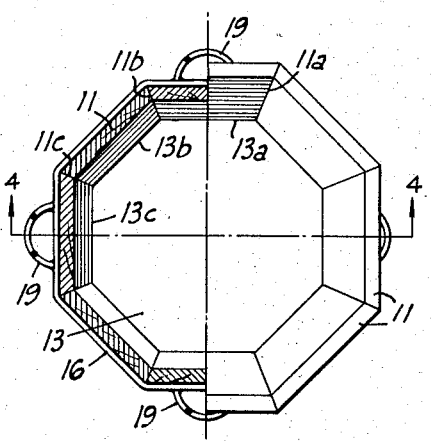
FIG_2_
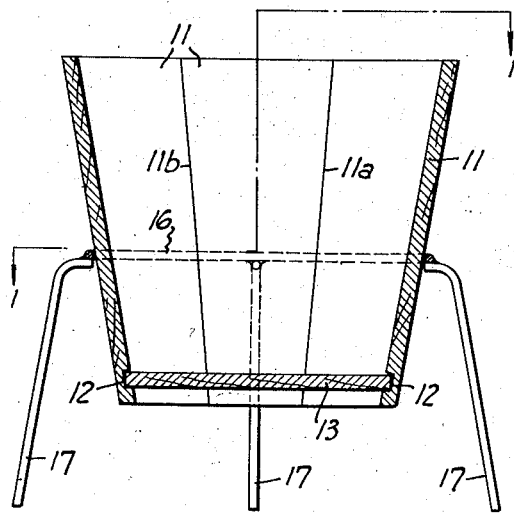
FIG_4_
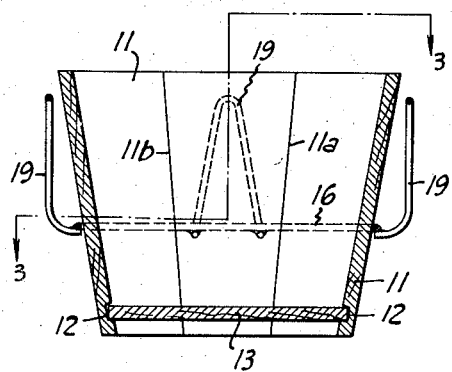
INVENTOR.
Thomas S. Nelson
BY
ATTORNEYS

2,881,939
PLANTER

Thomas S. Nelson, Santa Cruz, Calif.

Application July 12, 1956, Serial No. 597,453

2 Claims. (Cl. 217—12)

This invention relates generally to a planter and more particularly to a planter of the type which is fabricated from wood.

In the manufacture and sale of a planter, it is desirable to provide a planter which can be shipped in a knocked-down condition to reduce shipping costs since the shipping costs are a substantial part of the total cost to the consumer. It is also desirable to provide a planter of this type which can be readily assembled by the user.

In general, it is an object of the present invention to provide an improved planter which can be shipped in a knocked-down form and readily assembled by the user.

Another object of the invention is to provide a planter of the above character which is economical to manufacture.

Another object of the invention is to provide a planter of the above character in which no nails, strapping and the like are required for assembly.

Another object of the invention is to provide a planter of the above character in which the same means can be used for suspending the planter or for supporting the planter on a surface.

Additional objects and features of the invention will appear from the following description in which the preferred embodiment has been set forth in detail in conjunction with the accompanying drawings.

Referring to the drawings:

Figure 1 is a sectional plan view of a planter taken along the line 1—1 of Figure 2 and incorporating the present invention.

Figure 2 is a cross-sectional view taken along the line 2—2 of Figure 1.

Figure 3 is a sectional plan view of another embodiment of a planter taken along the line 3—3 of Figure 4 and incorporating the present invention.

Figure 4 is a cross-sectional view taken along the line 4—4 of Figure 3.

In general, the present invention consists of a plurality of staves having tapered side edges which are urged into engagement with a bottom member by a hoop which provides the sole means for holding the staves in engagement with the bottom member. The hoop is provided with means for supporting the planter.

The planter shown in Figures 1 and 2 of the drawing consists of a plurality of staves 11. The staves are substantially flat and are provided with tapered side edges 11a and 11b. The side edges 11a and 11b are beveled inwardly so that the staves will fit together as hereinafter described.

The lower end of each of the staves is provided with a groove 12 which extends at right angles to the longitudinal axis of the staves and is adapted to accommodate the outer margin of a bottom wall member 13. The bottom wall member 13 can be of any desired shape but preferably should be formed in the shape of a polygon. For example, as shown in Figures 1 and 2, the bottom wall member can be made in the shape of an octagon. The bottom wall member is provided with a plurality of side edges 13a, 13b, 13c, etc. which are preferably of equal length. The length of each of the sides should be equal to the width of each of the staves at the point on the staves where the bottom wall member is adapted to seat in the groove 12. In this way, a stave 11 may be mounted on each side edge of the bottom wall member 13.

The staves 11 are adapted to be held in engagement with the bottom wall member 13 by suitable hoop-like means which engages the staves at a point below the mid-point of the staves so that the weight of the staves and the bottom wall member serves to urge the lower ends of the staves into firm engagement with the bottom wall member. Such means can consist of a hoop-like member 16 also formed in the shape of a polygon to accommodate the polygon shape formed by the staves. The hoop-like member 16 should be of such a size that the staves 11 when mounted on the bottom wall member 13 will not slip through the hoop-like member 16 a distance greater than one half of the length of the staves 11 so that the weight of the staves and the bottom wall member will create force components at the lower ends of the staves which will urge the lower ends of the staves into engagement with the bottom wall member 13. In other words, the hoop-like member 16 should engage the staves 11 at a point below a point equidistant from the upper and lower ends of the staves.

It is necessary that the hoop-like member 16 be carried or supported at an elevated level so that at no time the staves 11 rest upon a supporting surface. The reason for this is readily apparent. As soon as the hoop-like member 16 fails to support the weight of the staves and the bottom wall member 13, the staves will fall away from the bottom wall member 13 and the planter will collapse.

Thus, suitable means is provided for supporting or carrying the hoop-like member 16 at a sufficient elevation so that the staves 11 do not rest on a floor, table or other support. Such means can consist of three legs 17 which are fixed to the hoop-like member 16 by suitable means such as welding to provide a tripod for supporting the planter.

In Figures 3 and 4 another embodiment of my invention is shown in which the hoop-like member 16 is carried by V-shaped members 19 which are fixed to the hoop-like member 16 by suitable means such as welding. By attaching the ends of a chain or rope (not shown) to the V-shaped members 19, it is apparent that the planter may be suspended from any suitable location. By removing the hoop-like members 16 with the V-shaped members attached thereto and reversing the same, the V-shaped members 19 can serve as legs to support the planter above the floor in a manner similar to that shown in Figure 2.

The assembly and disassembly of my planter may now be briefly described as follows: Let it be assumed that the side wall members or staves 11 and the bottom wall member 13 have been fabricated from a suitable material such as redwood and are shipped in this knocked-down condition. The staves are then mounted on the bottom wall member 13 in such a manner that the grooves 12 engage the outer margin of the bottom wall member. While holding the staves 11 loosely on the bottom wall member 13, the entire assembly is lowered into the hoop-like member 16 until the outer surfaces of the staves engage the hoop-like member 16. The hoop-like member will serve to urge the staves into a close side-by-side relationship and also will urge the lower ends of the staves into engagement with the bottom wall member 13 to provide a completed planter. The planter may then be planted and moved about at will by grasping the hoop-like member 16.

By utilizing the reversible supporting means shown in Figures 3 and 4, the planter may either be hung from a rafter or the like or carried by a supporting surface.

It is apparent from the foregoing that I have provided a new and improved planter which can be easily shipped in a knocked-down form and readily assembled by the user. The construction of the planter is also such that it may be economically manufactured.

I claim:

1. In a planter, a polygonal bottom wall member, a plurality of tapered flat staves having beveled side edges, each of said staves being formed with an inner groove at its lower end accommodating the outer margins of the bottom wall member, the bottom portion of each of said staves in the region of said grooves having a width equal to the width of one of the side edges of the bottom wall member, said staves being wider at the top than at bottom portions and inclined outwardly from the vertical, a single polygonal hoop-like member engaging said inclined staves, said hoop-like member having a size proportioned with respect to the staves so that it engages the staves in a region below points equidistant from the upper and lower ends of the staves but at a substantial elevation above said bottom wall member, and supporting means secured to said hoop-like member and constructed to rest on a surface, whereby the weight of the bottom wall member and staves acts to urge the lower ends of the staves into engagement with the bottom wall member and the hoop-like member into a holding position confining said staves, said hoop-like member providing the sole means for holding the staves in engagement with the bottom wall member.

2. A planter as in claim 1 wherein said means for supporting said hoop-like member comprises at least three supporting members, said supporting members extending generally at substantially right angles to the plane of the hoop-like member, said hoop-like member and the supporting members secured thereto being reversible to provide means for suspending said planter or for supporting said planter.

References Cited in the file of this patent

UNITED STATES PATENTS

| 285,429 | Palmer | Sept. 25, 1883 |
| 412,160 | Bond | Oct. 1, 1889 |
| 1,012,839 | Gilger | Dec. 26, 1911 |
| 1,712,986 | Favata | May 14, 1929 |

FOREIGN PATENTS

| 255,067 | Italy | Oct. 6, 1927 |